Feb. 12, 1952     M. W. GREDELL     2,585,113
SHEAR PIN COUPLING FOR ALIGNED SHAFTS

Filed Feb. 12, 1946

INVENTOR.
MARCELLUS W. GREDELL

BY Edward M. Apple

ATTORNEY

Patented Feb. 12, 1952

2,585,113

UNITED STATES PATENT OFFICE 2,585,113

SHEAR PIN COUPLING FOR ALIGNED SHAFTS

Marcellus W. Gredell, Detroit, Mich., assignor to Gredell Corporation, Detroit, Mich., a corporation of Michigan Application February 12, 1946, Serial No. 647,073

4 Claims. (Cl. 64—28)

This invention relates to mechanical power transmission, and has particular reference to a coupling for use on the propeller shaft of a marine engine.

An object of the invention is the provision of a propeller shaft coupling, which is provided with an in-board shear pin which will obviate the necessity of dry-docking or beaching the craft in order to replace a shear pin should the propeller hit an obstruction and damage the pin.

Another object of the invention is the provision of a device of the character indicated, which is mounted in-board for ready accessibility.

Another object of the invention is the provision of a propeller shaft coupling, which is simple in construction, economical to manufacture, and easy to install and disassemble.

The foregoing and other objects and advantages of the invention will appear as the descriptions proceed, reference being made from time to time to the accompanying drawings forming part of the within disclosure, in which drawings.

Figure 1:
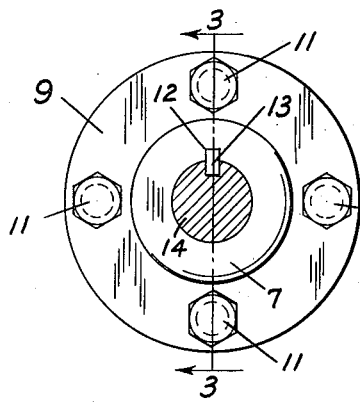
Fig. 1 is an elevational view, with parts in section, of one end of the device embodying my invention.
Figure 2:
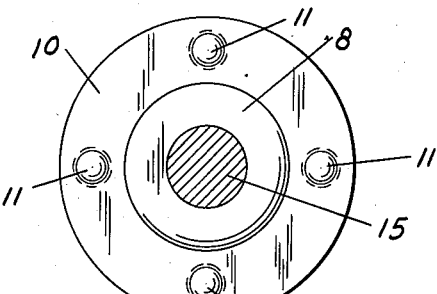
Fig. 2 is an elevational view of the opposite end of the device shown in Fig. 1.
Figure 3:
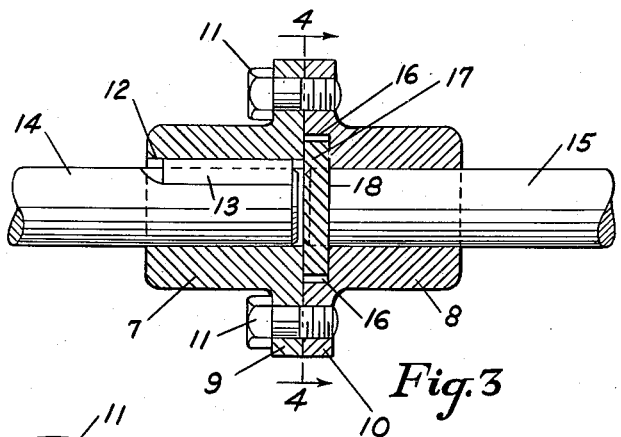
Fig. 3 is a longitudinal vertical section of the device illustrated in Fig. 1, and taken substantially on the line 3—3 of Fig. 1.
Figure 4:
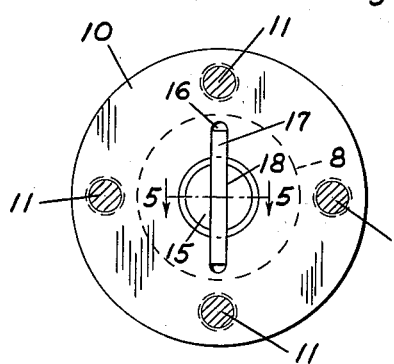
Fig. 4 is a section taken on the line 4—4 of Fig. 3.
Figure 5:
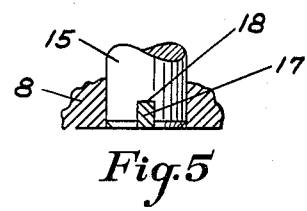
Fig. 5 is a section taken on the line 5—5 of Fig. 4

Referring now more particularly to the drawings, it will be understood that in the embodiment herein disclosed (Fig. 3), the device consists of collars 7 and 8 which are formed with flanges 9 and 10, which are adapted to be secured together by means of machine screws 11, which extend through straight bores formed in the flange 9 and engage threaded bores in the flange 10, so that the flange 10 may be removed quickly by simply retracting the machine screws 11 from the threaded areas.

The collar 7 is slotted as at 12 to accommodate a key 13 which engages a key slot formed in the end of the propeller shaft 14.

The collar 8 is adapted to accommodate the end of a drive shaft 15. A radial slot 16 is machined in the collar 8 and is adapted to accommodate the shear pin 17, which extends through a slot 18 formed in the end of the shaft 15.

In the event that the propeller strikes an obstacle, causing the shaft 14 to bind, the pin 17 is sheared from the shaft 15, permitting the shaft 15 to continue to rotate independent of the collar 8. Inasmuch as this installation is in-board, it is a simple matter to replace the shear pin 17 by retracting the machine screws 11 until the flange 10 is free and can be slid on the shaft 15.

Having described my invention, what I claim and desire to secure by Letters Patent is:

1. In a device of the character described, a pair of collars having matched rigid flanges adapted to be secured to one another by machine screws, a shaft extending into each of said collars, one of said shafts being keyed to one collar, the other said shaft being secured to the other collar by means of a shear pin having a length greater than the diameter of said shafts and positioned in a keyway formed along a diameter of said last named shaft.

2. In a device of the character described, the combination of a collar having a rigid flange, an axial bore in said collar, a shaft extending into said bore, longitudinal slots in said shaft and said bore, a key in said slots, a second collar in abutting relation to said first collar and having a rigid flange, said second collar having a bore, a shaft in said bore, radial slots in said collar a keyway formed along a diameter of said last-named shaft, a shear pin in said last-named slots and keyway said shear pin having a length greater than the diameter of said shafts, and means to secure said flanges together for unitary rotation.

3. In a device of the character described, the combination of a drive shaft and a propeller shaft, a collar keyed for fixed rotation with said propeller shaft, said collar having a rigid peripheral flange having bores therein, a second collar having a rigid flange adapted to be secured to said first flange, said drive shaft being secured to said second collar by means of a shearable pin of greater length than the diameter of said drive shaft, said shearable pin being positioned in a keyway disposed along a diameter of said drive shaft.

4. In a device of the character described, the combination of a pair of aligned shafts, a longitudinal keyway in one of said shafts, a rigid flanged collar on said shaft, a keyway in said collar in alignment with said first named keyway a key in said keyways, a keyway disposed along a diameter of the second shaft, a rigid flanged collar on said second shaft abutting said other collar and having a radial slot in alignment with the keyway in said second shaft a pin in said slot and said last-named keyway and means for securing together the rigid flanges of said collars.

MARCELLUS W. GREDELL.

REFERENCES CITED

The following references are of record in the file of this patent:

UNITED STATES PATENTS

| Number | Name | Date |
|---|---|---|
| 349,365 | Roots | Sept. 21, 1886 |
| 939,744 | Richardson | Nov. 9, 1909 |
| 1,685,098 | Sklovsky | Sept. 25, 1928 |
| 1,805,879 | McKenny | May 19, 1931 |
| 1,941,061 | Thiry | Dec. 26, 1933 |
| 2,050,630 | Reid | Aug. 11, 1936 |